United States Patent [19]

Mueller et al.

[11] Patent Number: 5,157,748
[45] Date of Patent: Oct. 20, 1992

[54] CONTROLLABLE INTEGRATED OPTICAL DIRECTIONAL COUPLER

[75] Inventors: Gustav Mueller; Lothar Stoll, both of Munich, Fed. Rep. of Germany

[73] Assignee: Siemens Aktiengesellschaft, Munich, Fed. Rep. of Germany

[21] Appl. No.: 744,897

[22] Filed: Aug. 14, 1991

[30] Foreign Application Priority Data

Sep. 28, 1990 [DE] Fed. Rep. of Germany ....... 4030754

[51] Int. Cl.⁵ .......................... G02B 6/10; G02F 1/015
[52] U.S. Cl. ......................................... 385/41; 385/131
[58] Field of Search ....................... 385/42, 39, 40, 41, 385/44, 45, 50, 129, 130, 131

[56] References Cited

U.S. PATENT DOCUMENTS

| | | | |
|---|---|---|---|
| 4,492,425 | 1/1985 | Kersten et al. | 385/41 |
| 5,004,447 | 4/1991 | Soref | 385/42 X |

*Primary Examiner*—John D. Lee
*Assistant Examiner*—Phan T. Heartney
*Attorney, Agent, or Firm*—Hill, Van Santen, Steadman & Simpson

[57] ABSTRACT

An integrated optical directional coupler is formed of two strip waveguides integrated on a substrate. A strip waveguide section in a coupling section of the directional coupler is designed as a controllable strip waveguide. The strip waveguides outside of this section are passive strip waveguides. In order to guarantee a largely polarization-dependent function of this coupler and of an optical switch realized therewith, the passive waveguides comprise a defined, different strip waveguide structure than the controllable strip waveguide.

17 Claims, 1 Drawing Sheet

5,157,748

CONTROLLABLE INTEGRATED OPTICAL DIRECTIONAL COUPLER

RELATED APPLICATION

The present application is related to the pending application of Mueller et al entitled "CONTROLLABLE INTEGRATED OPTICAL MACH-ZEHNDER INTERFEROMETER", Hill Case No. P-91,1578, U.S. Ser. No. 744,898, filed Aug. 14, 1990.

BACKGROUND OF THE INVENTION

The invention is directed to a controllable optical directional coupler formed of two strip waveguides integrated on a substrate of semiconductor material, as proposed in the earlier German Patent Application P 39 29 131.6 (GR 89 P 1730 DE), incorporated herein.

In the proposed directional coupler, the pn-junction or pin-junction extends over the entire length of the two strip waveguides designed as rib waveguides. These strip waveguides thus have a uniform waveguide structure, whereby the pin-junction is electrically controllable via electrical contacts only in the coupling section.

This directional coupler can be operated as an optical switch which supplies an optical input signal to the one or to the other output of the switch, depending on an electrical control signal.

In the proposed directional coupler, the function of this component is generally dependent on the polarization of the input signal, i.e. TE-polarized input signals are distributed differently onto the outputs than TM-polarized input signals with a given geometry.

SUMMARY OF THE INVENTION

It is an object of the invention to improve a directional coupler of the said type to the affect that a largely polarization-independent function of this coupler and of an optical switch realized therewith is guaranteed.

This object is achieved with the controllable integrated optical directional coupler of the invention which is formed of two strip waveguides of a defined width and which is integrated on a substrate of semiconductor material. The two strip waveguides are defined by an undoped or n-doped waveguiding layer of the substrate. The strip waveguides proceed in side-by-side fashion in a coupling section at a distance from one another which is sufficiently small such that an optical wave guided in the waveguiding layer of the one strip waveguide can couple over into the waveguiding layer of the other strip waveguide. At least one of the strip waveguides has in a phase shifting section within the coupling section a rib of semiconductor material which is arranged over the waveguiding layer and defines its width. A pn-junction or a pin-junction which is electrically controllable via contacts is integrated within the phase shifting section in the region of the rib above or below the waveguiding layer such that a transition from p-doped material of the rib in the direction toward n-doped or undoped material of a spacer layer is arranged at a distance D from the waveguiding layer. The p-doped material is situated at a side of this transition which faces away from the waveguiding layer. The section of the strip waveguide in the phase shifting section comprises said electrically controllable pn-junction or pin-junction and is thus an electrically controllable strip waveguide thereat. Sections of the strip waveguide situated outside of the electrically controllable strip waveguide section form a passive strip waveguide. The passive strip waveguide comprises a strip waveguide structure which is free of a pn-junction or a pin-junction.

With the directional coupler of the invention, the strip waveguide structures of the passive strip waveguides have the advantage that they are suitable for integration with the laser diode disclosed in the earlier German Patent Application P 40 14 234.5 (GR 90 P 1231 DE), incorporated herein. Moreover, they can be manufactured in a simple way from the strip waveguide structure of the electrically controllable strip waveguide by omitting or by etching off upper layers.

DESCRIPTION OF THE PREFERRED EMBODIMENTS

Figure 1:
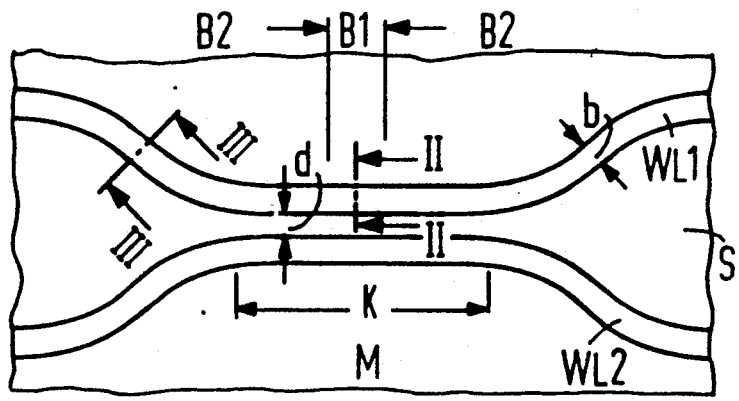
FIG. 1 is a plan view onto an exemplary directional coupler of the invention.

In the directional coupler of FIG. 1, the strip waveguides WL1 and WL2 having a defined width b in the coupling section K and which are integrated on the substrate S, are conducted side-by-side at a slight distance d which is so small that an optical wave guided in this coupling section K in the waveguiding layer of a strip waveguide WL1 or WL2 can couple over into the waveguiding layer of the other strip waveguide WL2 or WL1.

The strip waveguide section of a strip waveguide WL1 or WL2 which forms the electrically controllable strip waveguide is situated in the phase shifting section Ph and extends, for example, over the region B1. The strip waveguides WL1 and WL2 are passive strip waveguides outside of the region B1, i.e. in the region B2 to the left and to the right of the region B1.

The region B1 could also be split into two region halves, the one thereof being situated to the left and the other to the right of the middle M of the coupling section, whereby the two region halves have the same distance from the middle. In this case, the strip waveguide sections falling into the region halves are controllable strip waveguides, whereas the strip waveguide section falling between these region halves and the strip waveguide sections arranged to the left and right of these region halves are passive strip waveguides.

Figure 2:
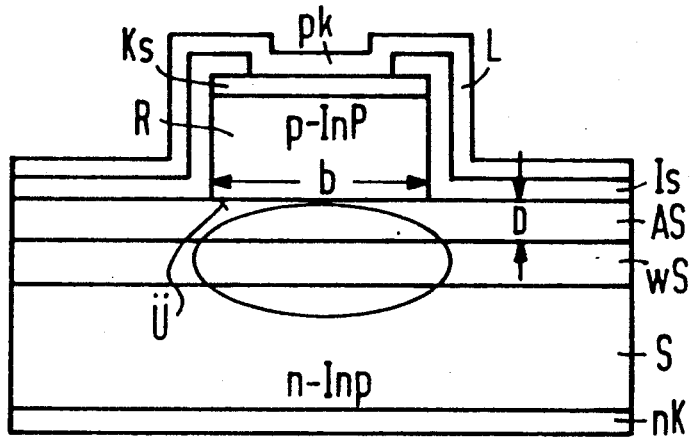
FIG. 2 is a sectional view taken along the section line II—II in FIG. 1 through the electrically controllable strip waveguide in the coupler section.

The strip waveguide structure of the controllable strip waveguide is shown in cross section in FIG. 2. According to this structure, a waveguiding layer wS is applied on a substrate S. A spacer layer AS having the thickness D is situated on the waveguiding layer wS, the rib R whose width b defines the width of the strip waveguide being in turn applied onto this spacer layer AS.

The substrate S is composed of n-doped semiconductor material. The waveguiding layer wS is likewise composed of n-doped semiconductor material, whereby material and/or doping of this waveguiding layer wS are selected such that its refractive index is higher than that of the substrate S.

The spacer layer AS is composed of n-doped or of undoped semiconductor material which is selected such that its refractive index is lower than that of the waveguiding layer S.

The rib R is composed of p-doped semiconductor material.

The n-doped material of the substrate S and of the waveguiding layer wS, the undoped material of the spacer layer AS, and the p-doped material of the rib R define a pn-junction or pin-junction wherein the transition Ü from p-doped material in the direction toward n-doped or undoped material is arranged at the distance D from the waveguiding layer wS.

A highly p-doped contact layer Ks which is contacted by a metallic contact pK is situated on the surface of the rib R. Electrical lines L leading to this contact pK are brought in on an electrically insulating layer Is, for example an oxide layer, which separates these lines L from the spacer layer AS and from the rib R.

The cooperating contact for the contact pK is applied on the underside of the substrate S and is referenced nK.

The substrate S and the rib R are composed, for example, of InP, whereas the waveguiding layer wS and the spacer layer AS are composed of InGaAsP. The material of the spacer layer AS can have a gap wavelength of 1.1 μm and the material of the waveguiding layer wS can have a gap wavelength of 1.25 μm.

The strip waveguide structure of the passive strip waveguides which is free of a pn-junction or a pin-junction can be constructed in various ways.

Figure 3A:
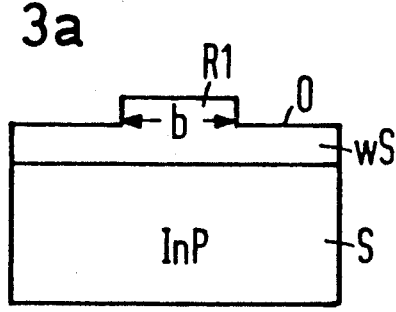
FIGS. 3a through 3d show respective exemplary cross sections taken along the section line III—III in FIG. 1 through a passive strip waveguide of the directional coupler of the invention wherein various strip waveguide structures that are possible for such a passive strip waveguide are shown.
Figure 3B:
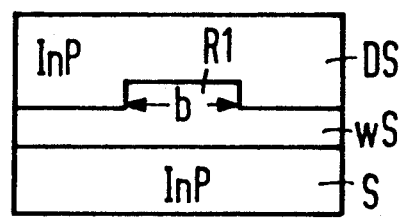

In the embodiments of FIGS. 3a and 3b, this structure is defined by a rib R1 forming a thicker region of the waveguiding layer wS of the n-doped or undoped semiconductor material whose width b defines the width of the passive strip waveguide WL1 or WL2. The waveguiding layer wS at the surface O facing away from the substrate S is adjacent to air or to some other uniform material, for example the material of the substrate S.

In the embodiment of FIG. 3b, the structure comprises a strip-shaped waveguiding layer wS whose width b defines the width of the passive strip waveguide. This strip-shaped waveguiding layer wS is surrounded by uniform material of the substrate. However, it can also be established such that, for example, the strip-shaped waveguiding layer wS is designed on the surface of the substrate S and is covered by a cover layer composed of a uniform material or remains free. In this case, air or the other uniform material are adjacent to this strip-shaped waveguiding layer wS and to the substrate S.

Figure 3C:
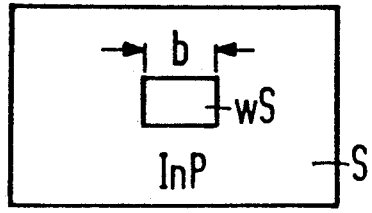

In the embodiment of FIG. 3c, the waveguiding layer wS is surrounded by the substrate and has a width b.

Figure 3D:
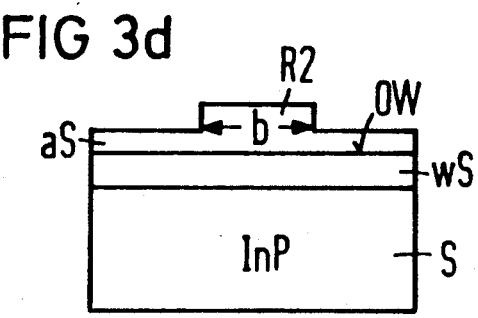

In the embodiment of FIG. 3d, the strip waveguide structure which is free of a pn-junction and a pin-junction is defined by a rib R2 forming a thicker region of a further layer aS composed of a uniform material which is arranged on or over the waveguiding layer wS, the width b of this rib R2 defining the width of the passive strip waveguide WL1, WL2. Thus, the further layer aS on a surface OW facing away from the waveguiding layer wS is adjacent to air or to some other uniform material.

The directional coupler of the invention can be advantageously manufactured such that, first, the substrate S having the waveguiding layer wS, the spacer layer AS, and the rib R arranged thereon is manufactured first in a traditional technology. The rib R remains in the region B1, whereby the insulating layer IS, the contact pK, and the electrical lines L there are also realized in a traditional technology.

At least the rib R is removed in the region B2, for example by etching. One can also proceed such that no rib is produced in this region B1, i.e. this rib R is omitted in this region B2 from the very outset.

For manufacturing the strip waveguide structures of FIGS. 3a through 3c, the spacer layer AS is removed in the region B2, for example by etching. However, one can also proceed here such that this spacer layer AS is not produced in the region B2, i.e is omitted from the very outset.

The rib R1 of the waveguiding layer WS is produced by thinner etching of this waveguiding layer wS outside of the region of the rib R1.

In the case of FIG. 3b, a cover layer DS is applied onto the waveguiding layer wS after the rib R1 is produced, and is applied, for example, by epitaxy. This cover layer DS, for example, can be composed of the same material as the substrate S.

In the embodiment of FIG. 3c, one can proceed such that the planar, waveguiding layer wS is etched away down to a strip having the width b. One can also proceed such that only a strip-shaped, waveguiding layer having the width b is produced from the very outset, and thus the waveguiding layer outside of this strip is omitted from the very outset. The strip-shaped, waveguiding layer wS which is manufactured is covered with a cover layer that, for example, can be composed of the material of the substrate S and can be epitaxially produced. It is assumed in FIG. 3c that the cover layer and substrate S are composed of the same material, whereby the boundary between the cover layer and the substrate is omitted. The cover layer can also be omitted, so that the strip-shaped, waveguiding layer wS then adjoins air above the substrate S.

The embodiment of FIG. 3d, for example, is manufactured such that the spacer layer AS is etched thinner outside the region of the rib R. Thus, this layer AS forms the further layer aS.

Although various minor changes and modifications might be proposed by those skilled in the art, it will be understood that we wish to include within the claims of the patent warranted hereon all such changes and modifications as reasonably come within our contribution to the art.

We claim as our invention:

1. A controllable integrated optical directional coupler, comprising:
   a substrate of semiconductor material;
   first and second strip waveguides of a defined width integrated on the substrate and defined by waveguiding layers at the substrate;
   said first and second strip waveguides proceeding within a coupling section side-by-side to one another at a spacing which is sufficiently small such that an optical wave guided in the waveguiding layer of one of the strip waveguides can couple over into the waveguiding layer of the other strip waveguide;
   within the coupling section at least one of said strip waveguides having a rib of semiconductor material arranged over its waveguiding layer and which defines a width of the at least one strip waveguide where the rib is present, a semiconductor junction which is electrically controllable via contacts is integrated within said coupling section in a region of said rib of said at least one strip waveguide such that a transition from p-doped material of said rib to undoped or n-doped material is arranged at a specified distance from the waveguiding layer, and wherein the rib of p-doped material is situated at a side of this transition facing away from the waveguiding layer;

the section of the strip waveguide within the coupling section which is adjacent the semiconductor junction comprising an electrically controllable strip waveguide section; and sections of the strip waveguides situated outside of the electrically controllable strip waveguide section forming passive strip waveguides which are free of semiconductor junctions.

2. A directional coupler according to claim 1 wherein the strip waveguide sections which are free of pn- or pin-junctions comprises a strip-shaped waveguiding layer whose width defines a width of the passive strip waveguide and wherein this strip-shaped waveguiding layer is surrounded by the substrate.

3. A directional coupler according to claim 1 wherein a spacer layer is provided between said rib and said waveguiding layer, and wherein the spacer layer has a refractive index lower than a refractive index of the adjacent waveguiding layer.

4. A directional coupler according to claim 1 wherein a spacer layer is provided between said rib and said waveguiding layer, and wherein the spacer layer comprises undoped material.

5. A directional coupler according to claim 1 wherein a spacer layer is provided between said rib and said waveguiding layer, and wherein the spacer layer comprises n-doped material.

6. A directional coupler according to claim 1 wherein the semiconductor junction comprises a pn-junction.

7. A directional coupler according to claim 1 wherein the semiconductor junction comprises a pin-junction.

8. A directional coupler according to claim 1 wherein the waveguiding layer of the substrate comprises undoped semiconductor material.

9. A directional coupler according to claim 1 wherein the waveguiding layer of the substrate comprises n-doped semiconductor material.

10. A directional coupler according to claim 1 wherein said passive strip waveguide sections which are free of pn- and pin-junctions comprise a strip-shaped waveguiding layer whose width defines a width of the passive strip waveguide, and wherein this strip-shaped waveguiding layer is contacted by the substrate as a uniform material at one side and another uniform material at the other side.

11. A directional coupler according to claim 10 wherein said another uniform material at the other side is a material which is the same as the uniform material of the substrate.

12. A controllable integrated optical directional coupler, comprising:

a substrate of semiconductor material;

first and second strip waveguides of a defined width integrated on the substrate and defined by waveguiding layers at the substrate;

said first and second strip waveguides proceeding within a coupling section side-by-side to one another at a spacing which is sufficiently small such that an optical wave guided in the waveguiding layer of one of the strip waveguides can couple over into the waveguiding layer of the other strip waveguide;

within the coupling section at least one of said strip waveguides having a rib of semiconductor material arranged over its waveguiding layer and which defines a width of the at least one strip waveguide where the rib is present;

a semiconductor junction which is electrically controllable via contacts is integrated within said coupling section in a region of said rib of said at least one strip waveguide such that a transition from p-doped material of said rib to undoped or n-doped material is arranged at a specified distance from the waveguiding layer, and wherein the rib of p-doped material is situated at a side of this transition facing away from the waveguiding layer;

the section of the strip waveguide within the coupling section which is adjacent the semiconductor junction comprising an electrically controllable strip waveguide section;

sections of the strip waveguides situated outside of the electrically controllable strip waveguide section forming passive strip waveguides which are free of semiconductor junctions; and the controllable waveguide section lying within a phase shifting section which in turn lies within the coupling section.

13. A controllable integrated optical directional coupler, comprising:

a substrate of semiconductor material;

first and second strip waveguides of a defined width integrated on the substrate and defined by waveguiding layers at the substrate;

said first and second strip waveguides proceeding within a coupling section side-by-side to one another at a spacing which is sufficiently small such that an optical wave guided in the waveguiding layer of one of the strip waveguides can couple over into the waveguiding layer of the other strip waveguide;

within the coupling section at least one of said strip waveguides having a rib of semiconductor material arranged over its waveguiding layer and which defines a width of the at least one strip waveguide where the rib is present;

a semiconductor junction which is electrically controllable via contacts is integrated within said coupling section in a region of said rib of said at least one strip waveguide such that a transition from p-doped material of said rib to undoped or n-doped material is arranged at a specified distance from the waveguiding layer, and wherein the rib of p-doped material is situated at a side of this transition facing away from the waveguiding layer;

the section of the strip waveguide within the coupling section which is adjacent the semiconductor junction comprising an electrically controllable strip waveguide section;

sections of the strip waveguides situated outside of the electrically controllable strip waveguide section forming passive strip waveguides which are free of semiconductor junctions; and the controllable waveguide section lying within a phase shifting section which in turn lies within the coupling section.

14. A directional coupler according to claim 13 wherein the uniform material comprises air.

15. A controllable integrated optical directional coupler, comprising:

a substrate of semiconductor material;

first and second strip waveguides of a defined width integrated on the substrate and defined by waveguiding layers at the substrate;

said first and second strip waveguides proceeding within a coupling section side-by-side to one another at a spacing which is sufficiently small such that an optical wave guided in the waveguiding layer of one of the strip waveguides can couple over into the waveguiding layer of the other strip waveguide;

within the coupling section at least one of said strip waveguides having a rib of semiconductor material arranged over its waveguiding layer and which defines a width of the at least one strip waveguide where the rib is present;

a semiconductor junction which is electrically controllable via contacts is integrated within said coupling section in a region of said rib of said at least one strip waveguide such that a transition from p-doped material of said rib to undoped or n-doped material is arranged at a specified distance from the waveguiding layer, and wherein the rib of p-doped material is situated at a side of this transition facing away from the waveguiding layer;

the section of the strip waveguide within the coupling section which is adjacent the semiconductor junction comprising an electrically controllable strip waveguide section;

sections of the strip waveguides situated outside of the electrically controllable strip waveguide section forming passive strip waveguides which are free of semiconductor junctions; and said passive strip waveguide sections which are free of pn- or pin-junctions comprising a rib forming a thicker region of the waveguiding layer, a width of said rib defining a width of the passive strip waveguide, and wherein on a side facing away from the substrate the surface of the waveguiding layer with the rib is in direct contact with a uniform material.

16. A directional coupler according to claim 15 wherein the uniform material adjacent the further layer surface facing away from the waveguiding layer comprises air.

17. A controllable integrated optical directional coupler, comprising:

a substrate of semiconductor material;

first and second strip waveguides of a defined width integrated on the substrate and defined by waveguiding layers at the substrate;

said first and second strip waveguides proceeding within a coupling section side-by-side to one another at a spacing which is sufficiently small such that an optical wave guided in the waveguiding layer of one of the strip waveguides can couple over into the waveguiding layer of the other strip waveguide;

within the coupling section at least one of said strip waveguides having a rib of semiconductor material arranged over its waveguiding layer;

a semiconductor junction which is electrically controllable via contacts is provided within said coupling section in a region of said rib of said at least one strip waveguide;

the section of the strip waveguide within the coupling section which is adjacent the semiconductor junction comprising an electrically controllable strip waveguide section; and sections of the strip waveguides situated outside of the electrically controllable strip waveguide section forming passive strip waveguides which are free of semiconductor junctions.

* * * * *